Dec. 25, 1956 A. S. BENNETT ET AL 2,775,029
METHOD OF MAKING COMPOSITE METAL BODIES
Filed March 2, 1951 2 Sheets-Sheet 1
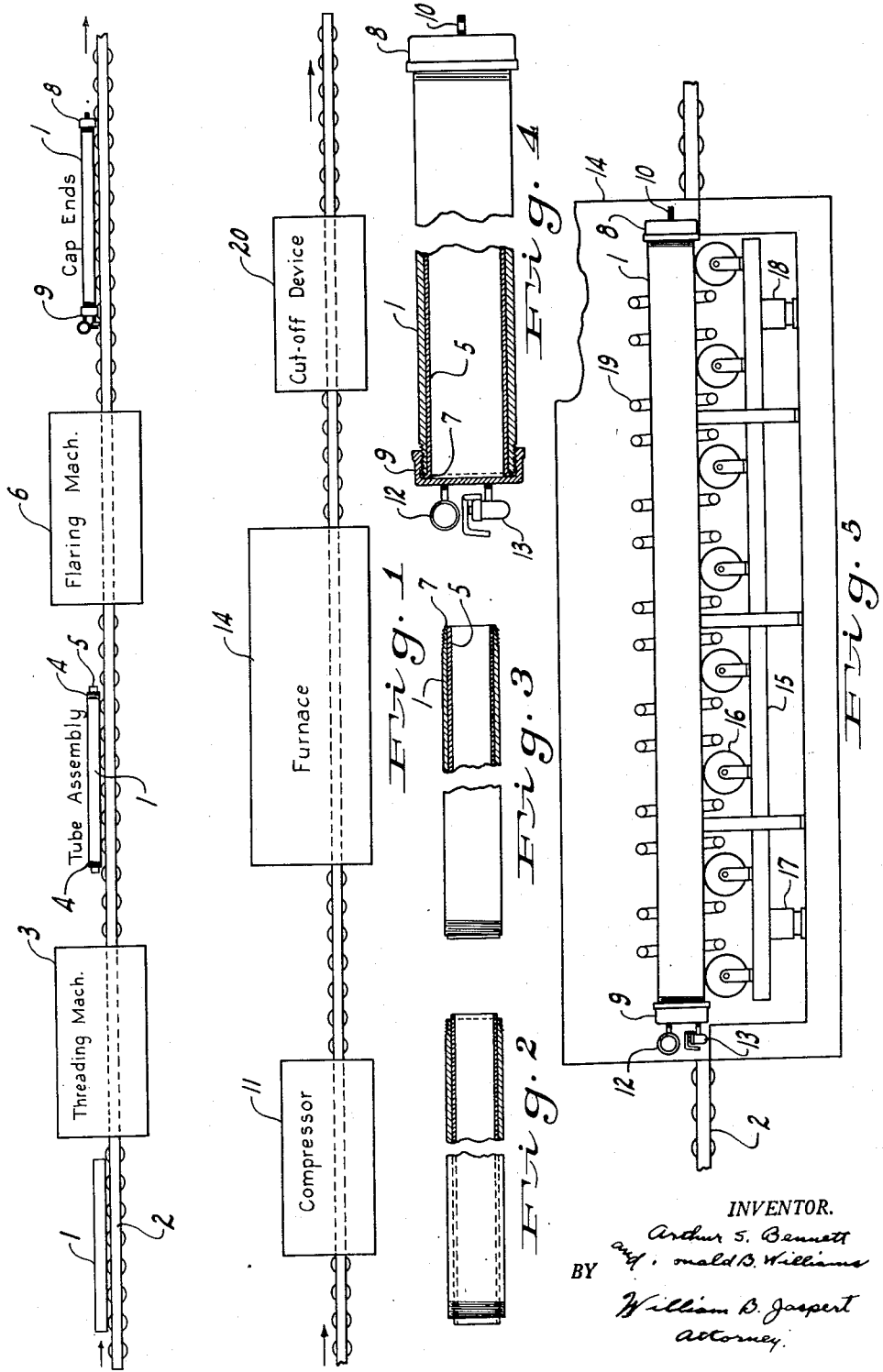
INVENTOR.
Arthur S. Bennett
and Donald B. Williams
BY
William B. Jaspert
Attorney.

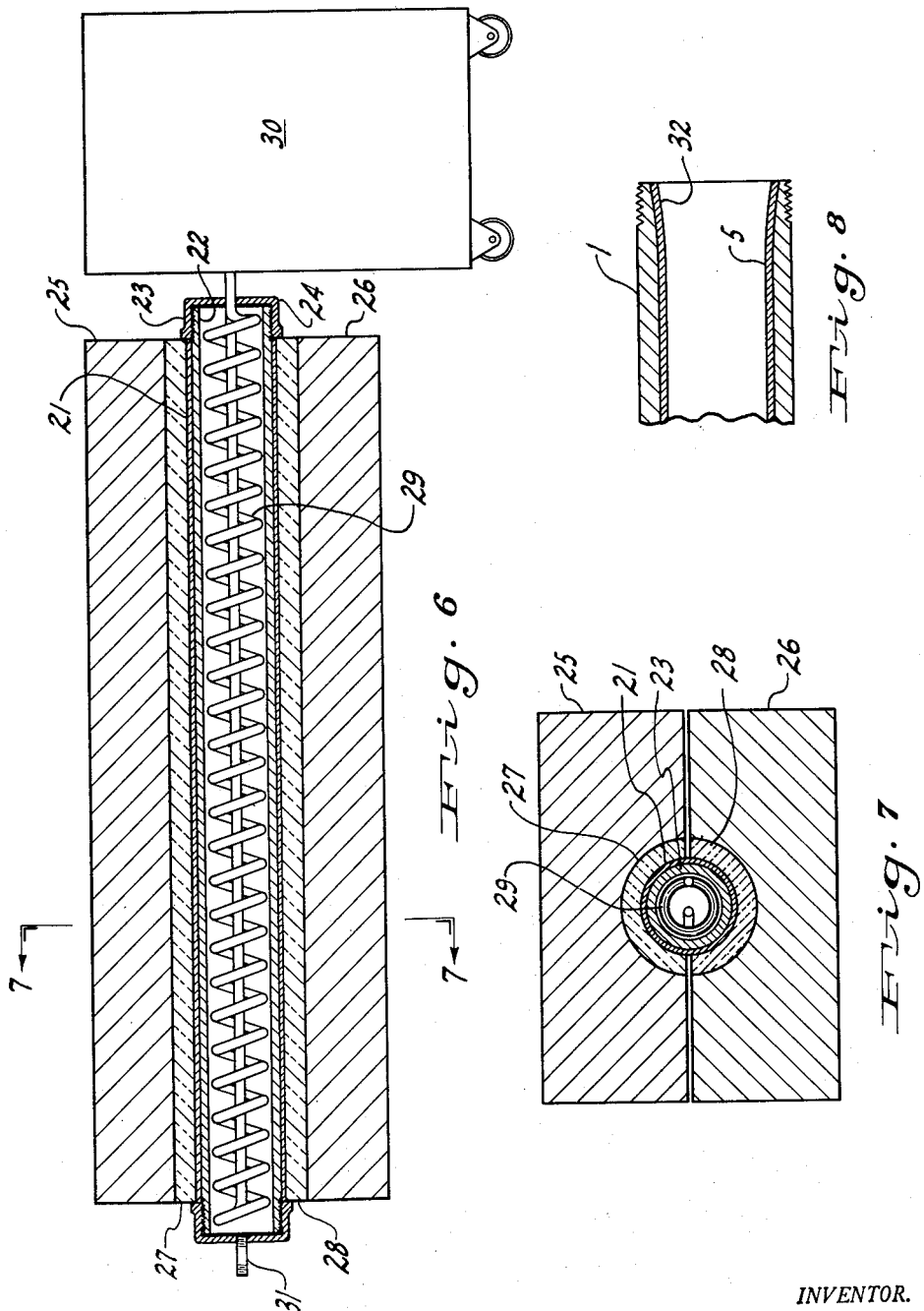

United States Patent Office 2,775,029
Patented Dec. 25, 1956

2,775,029

METHOD OF MAKING COMPOSITE METAL BODIES

Arthur S. Bennett, Pittsburgh, and Donald B. Williams, Canonsburg, Pa.

Application March 2, 1951, Serial No. 213,512

3 Claims. (Cl. 29—474.3)

This invention relates to a method of making composite tubing such as the combination of stainless steel and copper for use as mufflers, chemical piping, exhaust stacks, food processing, etc., and it is among the objects thereof to produce composite tubing of great structural rigidity with increased and improved electrical and thermal conductivity and which shall be corrosion resistant.

The present application is a continuation-in-part of an application Serial No. 201,802, filed December 20, 1950, now abandoned, in which is disclosed a method of making composite bodies with specific reference to sheet materials by assembling the sheets in an inert or gaseous atmosphere to prevent the occlusion of oxygen, and the present invention deals with means for adapting such method to the manufacture of tubular bodies.

In principle the invention deals with the joining of metals of different compositions, such as stainless steel with copper, by assembling them in contacting relation, heating the same to a suitable temperature, and subjecting the heated bodies to pressure to cause diffusion of the copper with the grain structure of the stainless steel.

This may be accomplished with tubular bodies in a manner which will be described in connection with the accompanying drawings, constituting a part hereof, in which like reference characters designate like parts, and in which Fig. 1 is a diagrammatic view illustrating different work stations and conveying means for making composite tubular structures in accordance with the present invention;

Fig. 2 a side elevational view, partially in cross section, of a composite tube assembly;

Fig. 3 a similar view illustrating the manner of sealing the inner tube with an outer tube;

Fig. 4 a side elevational view partially in cross section of a tube assembly with pressure gauge and valve;

Fig. 5 a side elevational view of a tube assembly in a heating furnace;

Fig. 6 a cross sectional view of a modified form of tube assembly and forming dies connected with an induction heater;

Fig. 7 a cross sectional view taken along the line 7—7, Fig. 6; and

Fig. 8 a fragmentary portion of a composite tube structure in cross section illustrating one method of sealing the inner tube with the outer tube.

With reference to the several figures of the drawing, the numeral 1 designates a metal tube, such as stainless steel, mounted on a roll conveyor 2 by which it is conveyed to a threading machine diagrammatically illustrated at 3 for threading both ends of the tube as shown at 4. An inner tube of copper or other material 5 is inserted in the tube 1 at the point designated "Tube Assembly" after it leaves the threading machine, with the ends of the inner tube 5 extending slightly beyond the threaded ends of tube 2. The assembly is passed to what is designated a "flaring machine" 6 in which the ends of the inner tube 5 are flared in the form of a flange 7 to abut the edge of the outer tube 1 in the manner shown in Fig. 3. After passing out of the flaring machine 6, end caps 8 and 9 are assembled on the threads of the tube 1 as is more clearly shown in Fig. 4 of the drawings, the end cap 8 having a nipple 10 for connection to a compressor designated by the numeral 11, Fig. 1, and the end cap 9 is provided with a pressure gauge 12 and a pressure valve 13. While in the compressor zone 11 the assembled tubes with the end caps sealed thereon are charged with compressed air or an inert or gaseous medium to a pressure sufficient to expand the relatively thin copper inner tube 5 against the inner wall of the stainless steel outer tube 1. When charged the assembly is passed into the heating furnace 14, Fig. 1, which is more clearly shown in Fig. 5 of the drawings.

Furnace 14 is provided with an adjustable roller table 15 supporting rollers 16 and operated by jacks 17 and 18, the table being adjustable to the size of the tube 1 passing into the furnace. The furnace is provided with an induction heating coil 19 and by adjusting the table 15 the tube 1 is centered with respect to the coil 19 as shown in Fig. 5. When charged into the furnace the assembled tubing is subjected to temperatures sufficient to soften one of the metals to cause it to diffuse with the surface of the other metal when subjected to pressure. In the case of stainless steel and copper the temperature is between 1600° F. to 1800° F., and where other metals are involved the temperature may be considerably higher. The heat renders the copper soft and yielding to the pressure of the gas in the tube, which pressure is increased by the temperature and causes the copper tube 5 to diffuse with the grain structure of the stainless steel outer tube 1 to effect a bond between these materials. The tube is then removed from the furnace and conveyed to a cut-off device 20, Fig. 1, where the end caps 8 and 9 are removed and the tube cut to desired length for further die drawing operations to elongate the tube and reduce the size, resulting in a finished product of uniform diameter and wall thickness with a stainless steel outer body portion and a copper inner body portion.

In the form of apparatus shown in Figs. 6 and 7, a copper tube 21 is joined to an inner steel tube 22 by compressing the copper tube around the inner tube. For this purpose the inner tube is threaded as shown at 23 to receive the end cap 24 which abuts the edge of the outer copper tube 21 to form a seal as shown in Fig. 6.

The tubes are placed between die blocks 25 and 26 having a heat insulating liner 27 and 28 which may be formed of asbestos or mica compositions having the ability to withstand compression. The die blocks are placed between the platens of a hydraulic or other suitable press to compress the copper tube 21 around the inner tube 22. An induction heating coil 29 extending from an induction heater 30 in the center of the inner tube 22 supplies suitable temperature for heating the tubing to soften the copper to diffuse the metal upon application of the pressure by the die block 25 and 26. A nipple 31 is provided to supply compressed air or gases to the inner tube to prevent collapse of the inner tube from pressure exerted on the outer tube by the die blocks. The induction heating coil 29 is water cooled under pressure which prevents collapse of the coil. By the use of the equipment of Figs. 6 and 7, a composite tube having the copper portion on the outside is produced. This again may be cut to length and die drawn to size.

In Fig. 8 is shown a method of sealing the inner copper tube 5 to the outer stainless steel tube 1 by spinning the copper against a shaped surface on the inner tube as designated by the numeral 32. This effects the same result as does the flange 7 shown in Fig. 3 of the drawings.

The pressures to be utilized in the tube assembly as shown in Fig. 5 of the drawings vary with the composition of the metal and the relative thickness of the inner tube to the outer tube, but may amount to several tons per square inch of surface.

Although several embodiments of the invention have been herein illustrated and described, it will be evident to those skilled in the art that various modifications may be made in the details of construction without departing from the principles herein set forth.

We claim:

1. The method of making composite metal tubing which comprises placing a relatively thin copper tube inside of a steel tube with the outer dimension of the copper tube of substantially the dimension of the inner diameter of the steel tube, flaring the ends of the copper tube to cause it to seal the space between said tubes, placing end caps on the steel tube, one of which is connected to a source of gaseous pressure, charging said copper tube with a compressed fluid of a pressure sufficient to deform the copper tube outwardly and placing the assembled tube structure in a heating furnace to heat the same to a bonding temperature below the melting temperature of either metal while under pressure of the compressed fluid to cause a diffusion of the metal of the contacting surfaces of the copper tube into the grain boundaries of the adjacent steel tube surfaces.

2. The method of making composite metal tubes which comprises threading the ends of a steel tube, inserting a relatively thin tube of different composition and lower melting temperature into said threaded tube, said inserted tube being of a diameter corresponding substantially to the inner diameter of the threaded tube, flaring the ends of the inserted tube to seal with the steel tube, placing end caps on the threads of the steel tube and effecting connection through one of said end caps with a source of compressed gaseous medium to fill the inner tube under pressure sufficient to deform the inserted tube outwardly, and subjecting the assembled structure to a heating temperature below the melting temperature of the metal in either tube while under pressure sufficient to cause diffusion of the contacting surfaces of said tubes.

3. The method of making composite tubes which comprises inserting a steel tube having threaded ends inside of an unthreaded relatively thin copper tube, the outer diameter of the steel tube being substantially the same as the inner diameter of the copper tube, placing screw caps on the threaded ends of the steel tube with the faces of the caps abutting the end faces of the copper tube to effect a seal, filling the steel tube with a pressure resistant medium and subjecting the copper tube to uniform pressure while the tube assembly is heated to a temperature below the melting temperature of the metal in either tube that is sufficient to cause diffusion of the metal of the contacting surfaces between the tubes to form an integral composite structure.

References Cited in the file of this patent
UNITED STATES PATENTS

| | | |
|---|---|---|
| 525,676 | Burdon | Sept. 4, 1894 |
| 895,412 | Badger | Aug. 11, 1908 |
| 942,184 | Persons | Dec. 7, 1909 |
| 1,016,770 | Persons | Feb. 6, 1912 |
| 1,441,459 | Small | Jan. 9, 1923 |
| 1,892,607 | Bundy | Dec. 27, 1932 |
| 1,914,774 | Govers | June 20, 1933 |
| 1,930,191 | Bundy | Oct. 10, 1933 |
| 2,086,135 | McIlvane | July 6, 1937 |
| 2,132,555 | Baxter | Oct. 11, 1938 |
| 2,228,139 | Leonhardy | Jan 7, 1941 |
| 2,267,665 | Raydt | Dec. 23, 1941 |
| 2,344,779 | Kolderman | Mar. 21, 1944 |
| 2,516,689 | France | July 25, 1950 |
| 2,713,196 | Brown | July 19, 1955 |